US011073629B2

(12) United States Patent
Padhi et al.

(10) Patent No.: US 11,073,629 B2
(45) Date of Patent: Jul. 27, 2021

(54) METHOD TO IMPROVE DAS CHANNEL LOCATION ACCURACY USING GLOBAL INVERSION

(71) Applicant: Halliburton Energy Services, Inc., Houston, TX (US)

(72) Inventors: Amit Padhi, Houston, TX (US); Mark Elliott Willis, Katy, TX (US); Xiang Wu, Singapore (SG); Andreas Ellmauthaler, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 92 days.

(21) Appl. No.: 16/558,972

(22) Filed: Sep. 3, 2019

(65) Prior Publication Data
US 2020/0116883 A1 Apr. 16, 2020

Related U.S. Application Data

(60) Provisional application No. 62/746,405, filed on Oct. 16, 2018.

(51) Int. Cl.
*G01V 1/30* (2006.01)
*G01V 1/28* (2006.01)

(52) U.S. Cl.
CPC .............. *G01V 1/302* (2013.01); *G01V 1/282* (2013.01); *G01V 1/288* (2013.01); *G01V 1/305* (2013.01)

(58) Field of Classification Search
CPC ........ G01V 1/282; G01V 1/288; G01V 1/302; G01V 1/305
See application file for complete search history.

(56) References Cited

U.S. PATENT DOCUMENTS 8,756,042 B2 * 6/2014 Tan .................. G01V 1/005
703/10
9,542,508 B2 * 1/2017 Altundas ............ G06F 30/20
(Continued)

FOREIGN PATENT DOCUMENTS

KR     101899079     9/2018
WO     2016207341    12/2016

OTHER PUBLICATIONS

Ellmauthaler, A., Willis, M., Barfoot, D., Wu, X., Erdemir, C., Barrios-Lopez, O., . . . Shaw, S. (2016). Depth calibration for DAS VSP: Lessons learned from two field trials. SEG Technical Program Expanded Abstracts 2016.

(Continued)

*Primary Examiner* — Elias Desta
(74) *Attorney, Agent, or Firm* — John Wustenberg; C. Tumey Law Group PLLC (57) ABSTRACT

A method for identifying a location of a distributed acoustic system channel in a distributed acoustic system. The method may comprise generating a two or three dimensional layer model interface with an information handling system, preparing a P-wave first arrival pick time table, estimating an initial model layer properties, estimating a location of the distributed acoustic system channels, preparing an overburden file of layer properties, running an anisotropic ray tracing, defining an upper and a lower limits for model parameters, specifying parameters for the inversion, running an inversion, selecting a solution based at least in part on stored error predictions, and calculating a mean and a standard deviation of an inverted model parameter.

20 Claims, 5 Drawing Sheets

(56) References Cited

U.S. PATENT DOCUMENTS

| | | | |
|---|---|---|---|
| 10,571,584 B2* | 2/2020 | Padhi | G06F 30/20 |
| 10,802,171 B2* | 10/2020 | Meek | G01V 1/282 |
| 2010/0128562 A1 | 5/2010 | Blias | |
| 2014/0078864 A1 | 3/2014 | Freitas | |
| 2017/0350245 A1 | 12/2017 | Padhi et al. | |

OTHER PUBLICATIONS

Storm, R. & Price, K., Differential Evolution—A Simple and Efficient Heuristic for Global Optimization over Continuous Spaces, Journal of Global Optimization, 1997.
International Search Report and Written Opinion for Application No. PCT/US2019/049349, dated Dec. 20, 2019.

* cited by examiner

METHOD TO IMPROVE DAS CHANNEL LOCATION ACCURACY USING GLOBAL INVERSION

BACKGROUND

Bore holes drilled into subterranean formations may enable recovery of desirable fluids (e.g., hydrocarbons) using a number of different techniques. Knowing the type of formation during drilling operations may be beneficial to operators as a bottom hole assembly traverses through different formations. For example, currently after the conclusion of drilling operations, a wireline system, distributed acoustic system (DAS), may be disposed within the borehole and measurements may be taken, covering a specific depth range. A vibration source, disposed on the surface, may be activated to cast seismic waves into formations below. A fiberoptic system may detect and allow the recording of the seismic waves as they traverse and/or reflect through the formation. The processing of the recording signals may be used to produce a profile of seismic velocity for the rock formations traversed by the waves, which may improve the identification of the rock formations or to measure various rock properties. This process of measuring the velocity of seismic waves may be repeated many times to form a vertical seismic profile (VSP).

However, DAS technology suffers from a fundamental problem arising out of positional uncertainty of the DAS channels. Some of the reasons for such uncertainty are incorrect assumptions about propagation velocity of the light pulse in the fiber, imprecise knowledge of the nominal length of the surface fiber cable, and fiber overstuffing. While it is possible to calibrate the depth of DAS channels using geophone data collected prior to DAS survey or using optical attenuation points, these methods have their limitations. For example, a geophone dataset may simply not be available in some cases. On the other hand, the use of optical attenuation points to calibrate depths may also not be well suited to several cases because of the lack of sufficient number of such calibration points.

BRIEF DESCRIPTION OF THE DRAWINGS

These drawings illustrate certain aspects of some examples of the present disclosure, and should not be used to limit or define the disclosure.

DETAILED DESCRIPTION

This disclosure relates to use of distributed acoustic sensing ("DAS") systems in a downhole environment. Examples may provide systems and methods for a methodology to invert picked travel times of the direct wave recorded on a DAS VSP data set to simultaneously obtain the DAS channel locations and anisotropic velocities of a three dimensional ("3D") layered model.

The DAS channel location inversion may be constrained by the measured well trajectory (from the well deviation survey) and may reduce uncertainties from the range of tens of meters to a few meters around the true location.

Figure 1:
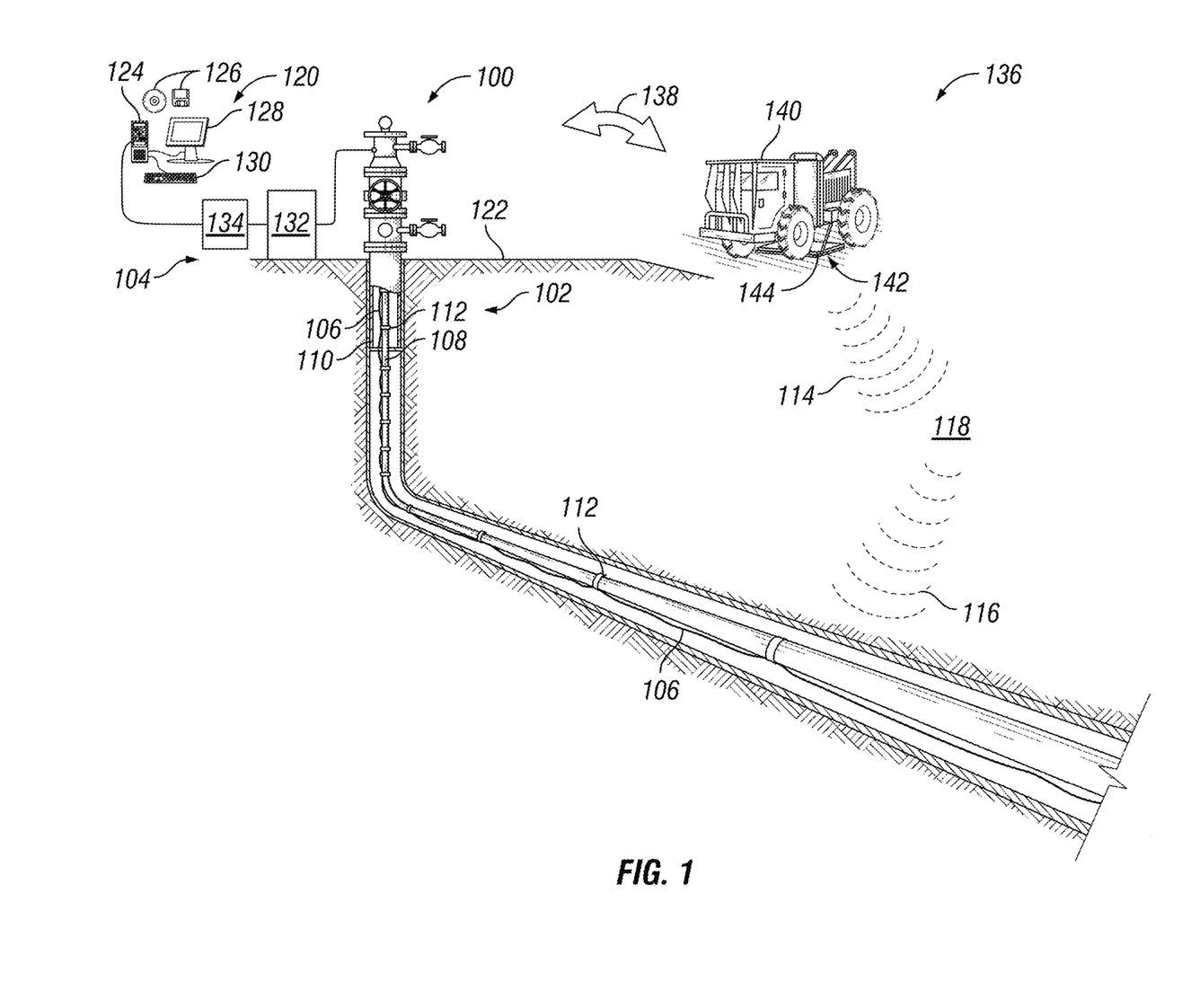
FIG. 1 illustrates an example of a distributed acoustic sensing system operating on a well system.

FIG. 1 generally illustrates an example of a well system 100 that may be used in a wellbore 102, which may include DAS system 104. It should be noted that well system 100 may be one example of a wide variety of well systems in which the principles of this disclosure may be utilized. Accordingly, it should be understood that the principles of this disclosure may not be limited to any of the details of the depicted well system 100, or the various components thereof, depicted in the drawings or otherwise described herein. For example, it is not necessary in keeping with the principles of this disclosure for completed well system 100 to include a generally vertical wellbore section and/or a generally horizontal wellbore section. Moreover, it is not necessary for formation fluids to be only produced from formation 118 since, in other examples, fluids may be injected into subterranean formation 118, or fluids may be both injected into and produced from subterranean formation 118, without departing from the scope of the disclosure. Additionally, wellbore 102 may be a producing well, an injection well, a recovery well, and/or an uncompleted well. Further, while FIG. 1 generally depicts land-based system, those skilled in the art will readily recognize that the principles described herein are equally applicable to a subsea operation, without departing from the scope of the disclosure.

In FIG. 1, DAS system 104 may be disposed along production tubing 108 and further within casing 110. As disclosed below, DAS system 104 may be permanently installed, semi-permanently installed, or temporally deployed in a wireline system, slickline system, coiled tubing system, and/or the like. DAS system 104 may include a fiber optic cable 106. Fiber optic cable 106 may be single mode, multi-mode, or a plurality thereof. In examples, fiber optic cable 106 may be permanently installed and/or temporarily installed in wellbore 102. Without limitation, DAS system 104 may operate and function to measure and produce a time-lapse vertical seismic profile ("VSP"). Light may be launched into the fiber optic cable 106 from surface 122 with light returned via the same fiber optic cable 106 detected at the surface 122. DAS system 104 may detect acoustic energy along the fiber optic cable 106 from the detected light returned to the surface 122. For example, measurement of backscattered light (e.g., Rayleigh backscattering) can be used to detect the acoustic energy (e.g., seismic waves 114 or reflected seismic waves 116). In additional examples, Bragg Grating or other suitable device can be used with the fiber optic cable 106 for detection of acoustic energy along the fiber optic cable. While FIG. 1 describes DAS system 104 and use of fiber optic cable 106 as the subsurface sensory array for detection of acoustic energy, it should be understood that examples may include other techniques for detection of acoustic energy in the wellbore 102. In examples, fiber optic cable 106 may be clamped to production tubing 108. However, fiber optic cable 106 may be clamped to production tubing through connection device 112 by any suitable means. It should be noted that fiber optic cable 106 may also be cemented in place within casing 110 and/or attached to casing 110 by any suitable means. Additionally, fiber optic cable 106 may be attached to coil tubing and/or a conveyance. A conveyance may include any suitable means for providing mechanical conveyance for fiber optic cable 106, including, but not limited to, wireline, slickline, pipe, drill pipe, downhole tractor, or the like. In some embodiments, the conveyance may provide mechanical suspension, as well as electrical connectivity, for fiber optic cable 106. The conveyance may comprise, in some instances, a plurality of electrical conductors extending from surface 122. The conveyance may comprise an inner core of seven electrical conductors covered by an insulating wrap. An inner and outer steel armor sheath may be wrapped in a helix in opposite directions around the conductors. The electrical conductors may be used for communicating power and telemetry to surface 122. Information from fiber optic cable 106 may be gathered and/or processed by information handling system 120, discussed below. For example, signals recorded by fiber optic cable 106 may be stored on memory and then processed by information handling system 120. The processing may be performed real-time during data acquisition or after recovery of fiber optic cable 106. Processing may alternatively occur downhole or may occur both downhole and at surface. In some embodiments, signals recorded by fiber optic cable 106 may be conducted to information handling system 120 by way of the conveyance. Information handling system 120 may process the signals, and the information contained therein may be displayed for an operator to observe and stored for future processing and reference. Without limitation, fiber optic cable 106 may be attached to coil tubing and/or the conveyance by any suitable means. Coil tubing and the conveyance may be disposed within production tubing 108 and/or wellbore 102 by any suitable means.

Figure 6A:
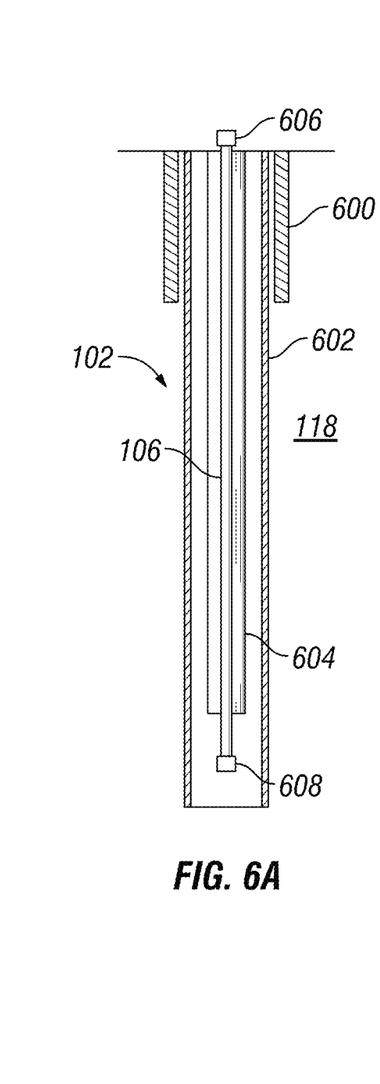
FIGS. 6A-6D illustrate different examples of a fiber optic cable deployed downhole in a distributed acoustic sensing system.

FIGS. 6A-6D illustrates different examples of deployment of fiber optic cable 106 in wellbore 102. As illustrated in FIG. 6A, wellbore 102 deployed subterranean formation 118 may include surface casing 600 in which production casing 602 may be deployed. Additionally, production tubing 604 may be deployed within production casing 602. In this example, fiber optic cable 106 may be temporarily deployed in a wireline system in which a bottom hole gauge 608 is connected to the distal end of fiber optic cable 106. Further illustrated, fiber optic cable 106 may be coupled to a fiber connection 606. Fiber connection 606 may operate with an optical feedthrough system (itself comprising a series of wet- and dry-mate optical connectors) in the wellhead that may optically couple fiber optic cable 106 from the tubing hanger to the wellhead instrument panel.

Figure 6B:
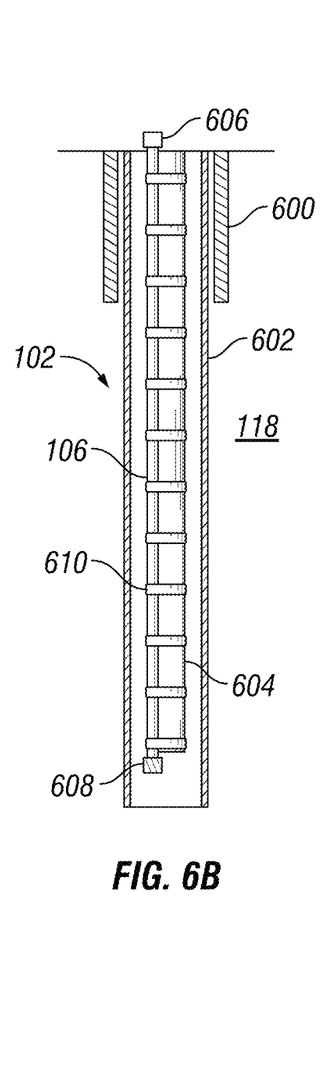

FIG. 6B illustrates a permeant deployment of fiber optic cable 106. As illustrated in wellbore 102 deployed in subterranean formation 118 may include surface casing 600 in which production casing 602 may be deployed. Additionally, production tubing 604 may be deployed within production casing 602. In examples, fiber optic cable 106 is attached to the outside of production tubing 604 by one or more cross-coupling protectors 610. Without limitation, cross-coupling protectors 610 may be evenly spaced and may be disposed on every other joint of production tubing 604. Further illustrated, fiber optic cable 106 may be coupled to fiber connection 606 at one end and bottom hole gauge 608 at the opposite end.

Figure 6C:
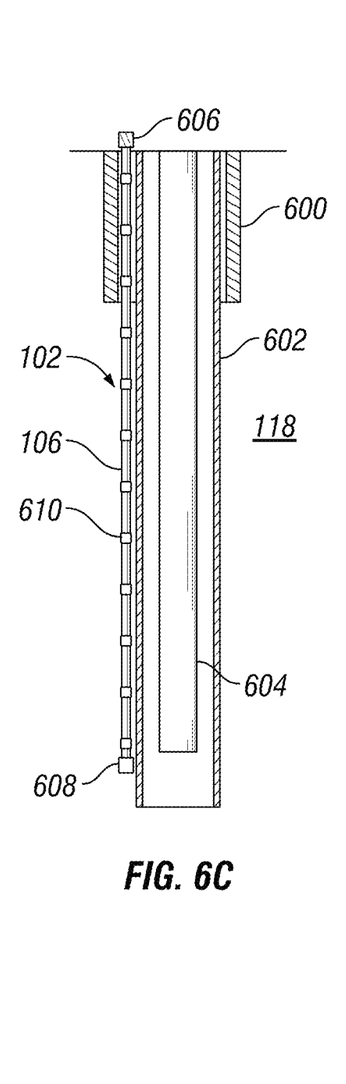

FIG. 6C illustrates a permeant deployment of fiber optic cable 106. As illustrated in wellbore 102 deployed in subterranean formation 118 may include surface casing 600 in which production casing 602 may be deployed. Additionally, production tubing 604 may be deployed within production casing 602. In examples, fiber optic cable 106 is attached to the outside of production casing 602 by one or more cross-coupling protectors 610. Without limitation, cross-coupling protectors 610 may be evenly spaced and may be disposed on every other joint of production tubing 604. Further illustrated, fiber optic cable 106 may be coupled to fiber connection 606 at one end and bottom hole gauge 108 at the opposite end.

Figure 6D:
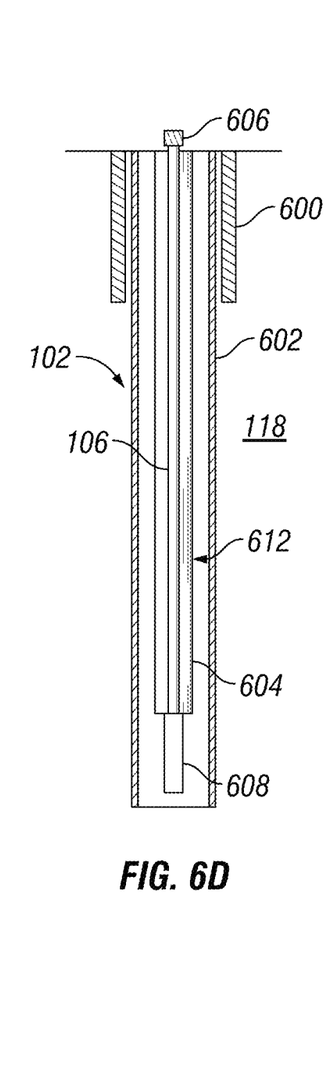

FIG. 6D illustrates a coiled tubing operation in which fiber optic cable 106 may be deployed temporarily. As illustrated in FIG. 6D, wellbore 102 deployed in subterranean formation 118 may include surface casing 200 in which production casing 602 may be deployed. Additionally, coiled tubing 612 may be deployed within production casing 602. In this example, fiber optic cable 106 may be temporarily deployed in a coiled tubing system in which a bottom hole gauge 608 is connected to the distal end of downhole fiber. Further illustrated, fiber optic cable 106 may be attached to coiled tubing 612, which may move fiber optic cable 106 through production casing 602. Further illustrated, fiber optic cable 106 may be coupled to fiber connection 606 at one end and bottom hole gauge 608 at the opposite end. During operations, fiber optic cable 106 may be used to take measurements within wellbore 102, which may be transmitted to the surface for further processing.

Referring back to FIG. 1, DAS system 104 may function and operate to measure seismic waves 114 and/or reflected seismic waves 116. Seismic waves 116 may illuminate elements (not illustrated) in formation 118. Seismic waves 114 and/or reflected seismic waves 116 may induce a dynamic strain signal in fiber optic cable 106, which may be recorded by the DAS system on information handling system 120. Measuring dynamic strain in fiber optic cable 106 may include a strain measurement, fiber curvature measurement, fiber temperature measurement, and/or energy of backscattered light measurement. A strain measurement may be performed by an operation of Brillouin scattering (via Brillouin Optical Time-Domain Reflectometry, BOTDR, or Brillouin Optical Time-Domain Analysis, BOTDA), or Rayleigh scattering utilizing Optical Frequency Domain Reflectometry (OFDR). A Fiber curvature measurement may be performed using Polarization Optical Time Domain Reflectometry (P-OTDR) or Polarization-Optical Frequency Domain Reflectometry (P-OFDR). A Fiber temperature measurement may be performed utilizing Raman DTS. An energy of backscattered light of DAS measurement may be performed utilizing an automatic thresholding scheme, the fiber end is set to the DAS channel for which the backscattered light energy flat lines. The purpose of all these measurements may be to compute the structure and properties of formation 118 at different times. This may allow an operator to perform reservoir monitoring.

Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit 124 (CPU) or hardware or software control logic, ROM, and/or other types of nonvolatile memory. Additional components of the information handling system 120 may include one or more disk drives 126, output devices 128, such as a video display, and one or more network ports for communication with external devices as well as an input device 130 (e.g., keyboard, mouse, etc.). Information handling system 120 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling system 120 may be connected to DAS system which may further include a single mode-multimode ("SM-MM") converter 132 and a Fiber Vertical Seismic Profile ("VSP") interrogator 134. SM-MM converter 132 may be used to convert between a single mode and a multimode for fiber communication. Fiber VSP interrogator 134 may be used to emit light pulses into the fiber optic cable 106 and translate the backscattered light pulses to digital information, which may be read by information handling system 120. In examples, information handling system 120 may communicate with DAS system 104 and act as a data processing system that analyzes measured and/or collected information. This processing may occur at surface 122 in real-time. Alternatively, the processing may occur at surface 122 and/or at another location.

It should be noted that information handling system 120 may be connected to DAS system 104. Without limitation, information handling system 120 may be a hard connection or a wireless connection 138. Information handling system 120 may record and/or process measurements from DAS system 104 individually and/or at the same time.

Seismic system 136 may include a seismic source 142. As illustrated, a vehicle 140 may house the seismic source 142. Seismic source 142 may be used to propagate seismic waves into subterranean formations 118. Without limitations, seismic source 142 may be a compressional source or a shear source. In examples, seismic source 142 may a truck-mounted seismic vibrator. However, without limitation, seismic source 142 may also include an air gun, an explosive device, a vibroseis, and/or the like. Seismic source 142 may include a baseplate 144 that may be lowered so as to be in contact with the ground. Vibrations of controlled and varying frequency may be imparted to the ground through baseplate 144. When the survey is completed, baseplate 144 may be raised, which may allow so seismic source 142 and vehicle 140 to move to another location.

During measurement operations, information handling system 120 may take into account reflected seismic waves 116 to produce a VSP. In one example, the seismic refraction data may be processed into a near-surface velocity model. Information handling system 120 may update the near-surface velocity model for seismic tomographic reconstruction (i.e., either travel time or waveform data). Further, information handling system 120 may update the travel time used for travel time tomographic reconstruction of the near-surface velocity model. This information may be used for reservoir monitoring over any length of time.

As discussed above, DAS technology may suffer from a fundamental problem arising out of positional uncertainty of DAS channels. DAS channels are defined as regularly spaced physical locations along the length of a fiber optic cable (e.g., DAS fiber) at which seismic measurements are made. The distance between each DAS channel is governed by the sampling rate of the optical receiver that is used to convert the analogue backscattered light signal into an electrical, digital data stream. The assumed position of each DAS channel is based on the arrival time of the backscattered light which in turn assumes a certain propagation velocity of the emitted light pulse in fiber optic cable 106. However, small deviations of the assumed propagation velocity, e.g. due to temperature fluctuations in the wellbore as well as other environmental effects may lead to subtle DAS channel spacing mismatches which accumulate over depth. Moreover, the nominal length of the surface fiber cable—defined as the length of fiber optic cable 106 between the Fiber VSP interrogator 134 and the wellhead fiber outlet—is usually not known precisely, causing a static depth offset between the assumed and true location of the recorded DAS channels. Additionally, fiber overstuffing which is done to prevent damage to fiber optic cable 106 during deployment in the well may further increase the overall positional uncertainty of the recorded DAS data. In order to mitigate the positional uncertainty of DAS channels, a methodology is discussed below to invert picked travel times of the direct wave recorded on a DAS VSP data set to simultaneously obtain the DAS channel locations and anisotropic velocities of a 3D layered model. It should be noted that the direct waves are compressional P waves that reach the DAS fiber and are recorded at a DAS channel from the source without reflecting off any seismic reflector. The DAS channel location inversion may be constrained by a measured well trajectory (e.g., from a well deviation survey) and may potentially reduce uncertainties from the range of tens of meters to a few meters around a true location.

Without limitation, inversions may take into account travel times. There are many well-known methods for picking the travel times (first breaks) of the direct wave. A first breaks refer to the arrival of the first P wave energy arrival at the DAS channels. For example, a threshold detection method may be used or alternatively a method of cross correlating a window around the first break on a trace by trace basis may be used. For the forward modeled travel time computation, one approach may be to use ray tracing to compute arrival times, while an alternative approach may be to use a travel time eikonal solver. An eikonal solver computes travel times from a source to all points in a gridded velocity model of the subsurface. The grid defines the distribution of seismic properties of the earth subsurface. The subsurface velocity model may be described by a constant isotropic medium, a constant anisotropic medium, a layer based medium with isotropic or anisotropic properties, or finally by a set of gridded cells with isotropic or anisotropic properties. The inversion algorithm may be performed by any one of a number of non-linear inversion schemes. Non-linear inversion scheme may include evolutionary algorithms, non-linear conjugate gradient methods, and a differential evolution.

As discussed below, systems and methods may compute travel times using shooting based ray tracing through a provided 3D isotropic or anisotropic starting model. Additionally, the anisotropy may be restricted to be up to a transversely isotropic media with a vertical axis of symmetry (VTI). However, any order of anisotropy may be included in the algorithm but increasing the level of anisotropy may include additional source effort to build enough ray travel path coverage of the subsurface model in order to create a constrained solution. A ray tracer utilized in a differential evolution algorithm may use a model that may stack layers. The interface between each layer may be described by a digitized 3D surface. For example, these interfaces may be created from interpreted and digitized images provided by surface seismic depth migration as a seismic depth image. As disclosed, additional sources and DAS channels may be placed anywhere within the subsurface media. This may enable the methodology to operate and/or function in both vertical and deviated wells.

Figure 2:
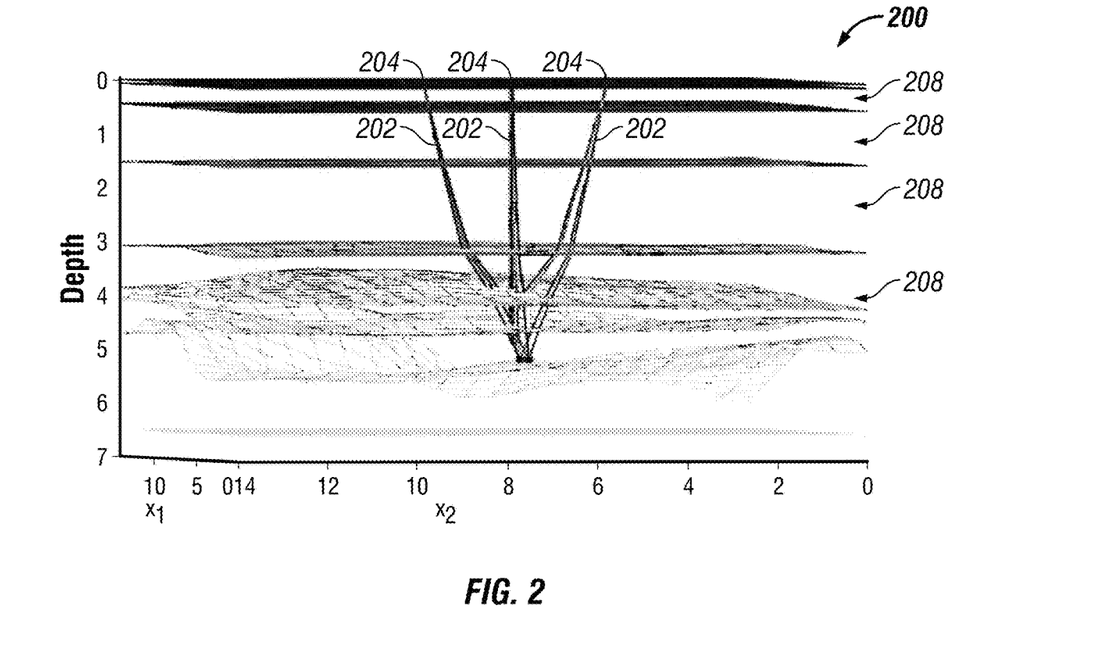
FIG. 2 illustrates a synthetic test on a model.

FIG. 2 illustrates an example of a 3D layered model 200. As shown, rays 202 may be traced from three sources 204 (e.g., such as a seismic source) to four DAS channels (not illustrated) in a 3D layered model 200. Layers 208 are assigned VTI properties in 3D layered model 200. Rays are paths along which seismic energy travels from a seismic source 142 like an airgun or vibroseis to the DAS channels, which collect the seismic data.

Figure 3:
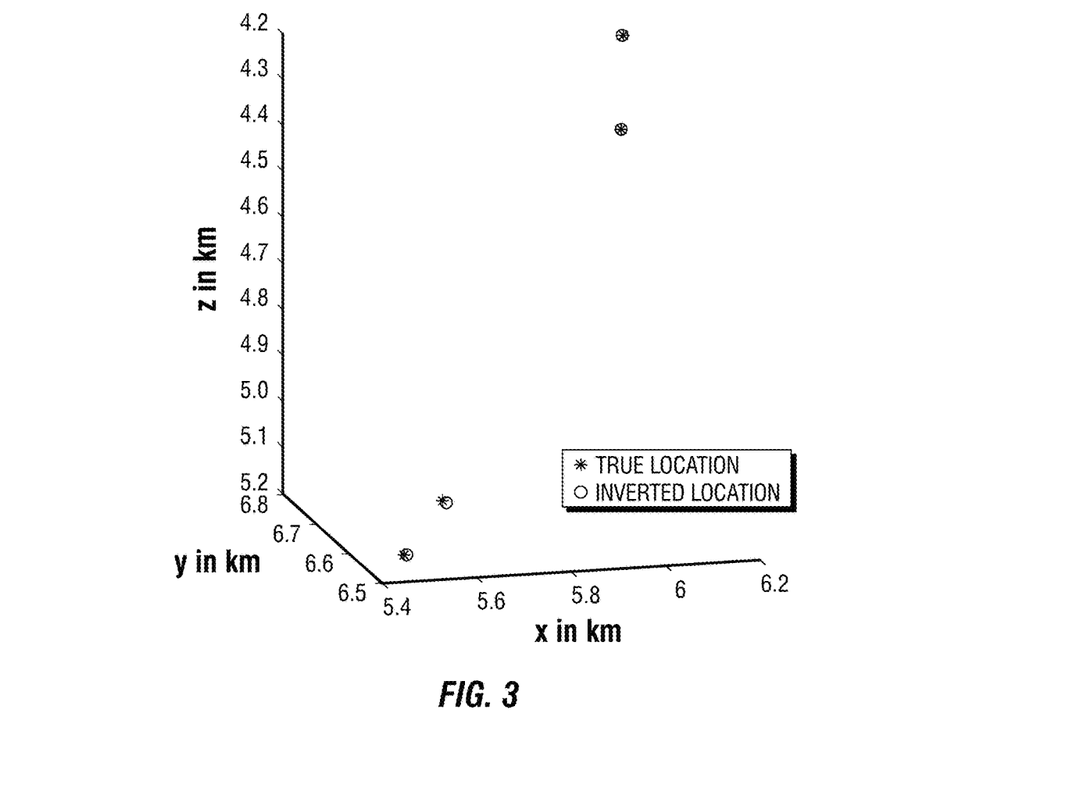
FIG. 3 is a graph illustrating inverted locations of a DAS channel.

A ray tracer may be incorporated into a global inversion scheme identified as Differential Evolution (DE). Without limitations, the inversion scheme may also be any suitable nonlinear global inversion scheme, such as, a particle swarm optimization, classical genetic algorithm, and/or the like. A ray tracer computes the travel times from source to DAS channel, DE is the inversion scheme that tries to match the travel time data collected from the seismic survey and hence improve the estimates of the physical properties of the subsurface. DE is defined as a population based evolutionary algorithm for optimizing a given objective. As illustrated in the graph of FIG. 3, DE may minimize a measure of misfit (L2 norm) between observed (measured) first arrival travel times and travel times predicted by the ray tracer. DE updates the VTI media (e.g., transversely isotropic media with vertical axis of symmetry) parameters ($V_{p_0}$, epsilon and delta) along with location of DAS channels to find inversion results that best fit the observed travel times.

In addition to the general principles, selected constraints may be used to regularize the DE inversion. For example, search limits may be selected for VTI media parameters for each layer 208 (e.g., referring to FIG. 2) being inverted for. Additionally, search limits may be applied for the X, Y, and Z coordinates for locations of DAS channels being inverted for simultaneously. Without limitation, DE solutions may be penalized that have an epsilon greater than delta and when the location of a DAS channel is such that their distance from the well trajectory cross a predefined threshold. This well trajectory is defined in terms of point coordinates along the well. Application of constraints along with the use of a global inversion may identify locations of DAS channels that may be within a few meters from a true location as evident from the graph of the synthetic test in FIG. 3. As noted above, three sources 204 as identifying individual sources may be limited due to data from the field. For example, limited data reduces the number of sources and may cause estimation of VTI parameters to suffer. However, the location of DAS channels were constrained after a DE inversion. As noted above, the DE inversion may be constrained to search windows that may be a few tens of meters wide. Results from the DE inversion within those windows may accurately locate the location of a DAS channel within a few meters. It should be noted here that in a field dataset however, the noise in the data and the inaccuracies of the picked horizons may cause the locations of DAS channels to have larger inaccuracies after inversion. Nonetheless, the error may be reduced significantly compared to the erroneous estimates from DAS data alone.

Figure 4:
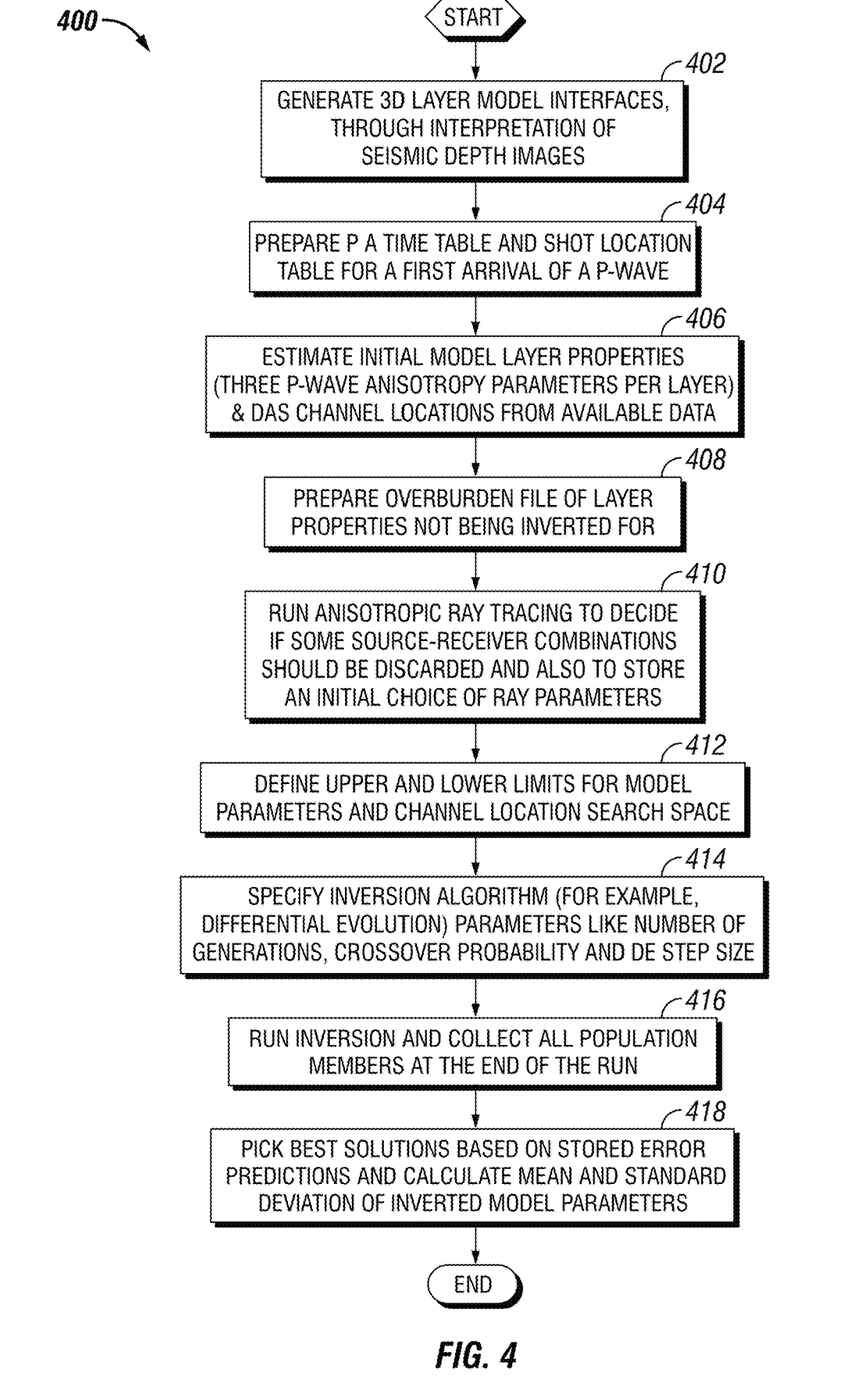
FIG. 4 is a flowchart for differential evolution.

FIG. 4 is an example of workflow 400 for an overall inversion algorithm for estimating layer properties and locations of DAS channels (e.g., referring to FIG. 1) simultaneously from first arrival travel times. Workflow 400 begins with block 402 for generating an interface for a 3D layered model 200 (e.g., referring to FIG. 2), for example, using a commercially available seismic interpretation package and the data available. Without limitation, 3D layered model 200 may be any multi-dimensional layer model, for example 2D, 3D, etc. In block 404, using the interface of the 3D layered model 200, a time table and shot location table may be prepared for a first arrival of a P-wave. From this information, in block 406 the initial model layer properties (three P-wave anisotropy parameters per layer) may be estimated and DAS channel locations may also be estimated from available data. In blocked 408 the estimated properties and location may be used for preparing overburden file of layer properties not being inverted for. In block 410 a forward model may be prepared, and anisotropic ray tracing may be run through the forward model to see if some source-DAS channel combinations should be discarded and to store an initial choice of ray parameters. After discarding combinations, in block 412, the upper and lower limits for modeling parameters and channel location search space may be defined for the forward model. The channel location search space is defined as the area bound by upper and lower limits in which a search is performed to identify a channel location. In block 414 an inversion algorithm (differential evolution) parameters like number of generations, crossover probability and DE step size may be specified. After identifying an inversion algorithm, in block 416 the chosen inversion may be performed, and all population members are collected at the end of the processing. Finally, in block 418 a best solution is picked based on stored error predictions and calculating mean and standard deviation of inverted model parameters to determine the location of one or more distributed acoustic system channels. A more specific workflow may be performed for a differential evolution.

Figure 5:
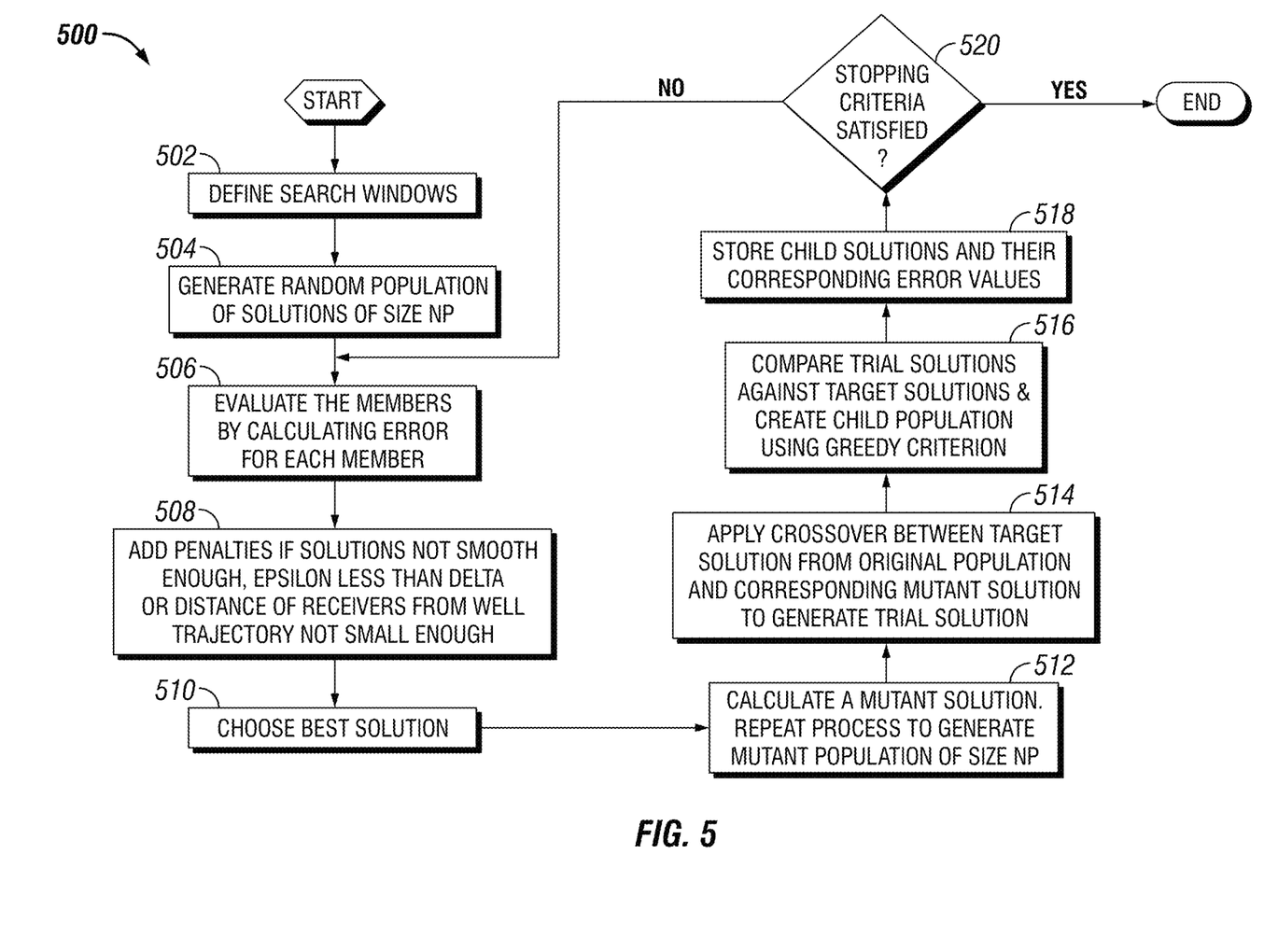
FIG. 5 is a flow chart for an overall inversion algorithm for estimating layer properties.

FIG. 5 illustrates workflow 500 for a differential evolution. Workflow 500 may begin with block 502 for defining one or more search windows. In block 504, after defining a search window a random population of solutions of any suitable size may be generated. In block 506 the generated population may be evaluated for each member by calculating error for each member. In block 508 one or more penalties may be added if solutions may not be smooth enough, for example if the epsilon is less than delta, or distance of DAS channels from well trajectory is not small enough. After penalties, in block 510 a solution may be chosen that satisfies the criteria in block 508, for example, where the epsilon is more than delta or the distance of DAS channels may be similar to predicted lengths. After choosing a solution, in block 512 a mutant solution may be calculated. It should be noted that to calculate and determine may be used interchangeably throughout this disclosure. A mutant solution may be defined as adding a random number, a mutation, chosen from a Gaussian distribution, or the like, to each solution. The process may be repeated to generate a mutant population of any size, wherein the amount of mutation in the mutant population is proportional to the standard deviation of the distribution, which may decrease with each new generation. After populating a mutant population, in block 514 a crossover between target solution from original population and corresponding mutant solution to generate trial solutions may be applied. In block 516 trial solutions may be compared against target solutions and create child population using a greedy criterion. Greedy criterion is defined as an algorithm in an algorithmic strategy that makes the best optimal choice at each small stage to lead to a globally optimum solution. In block 518 child solutions are stored in information handling system 120 as well as the corresponding error values for each child solution. In block 520 it is determined if stopping criteria has been satisfied. The stopping criteria compares the child solutions to stored error predictions. Additionally, the stopping criteria calculates a mean and standard deviation of inverted model parameters from the search windows established in block 502.

The preceding description provides various examples of the systems and methods of use for identifying the location of one or more distributed acoustic channels in a multi-dimensional model interface. Disclosed below are various method steps and alternative combinations of components.

Statement 1. A method may comprise generating a multi-dimensional model interface with an information handling system, preparing a time table for a first arrival of a P-wave based at least in part on the multi-dimensional model interface, estimating one or more initial model layer properties based at least in part on the multi-dimensional model interface, estimating a location of one or more distributed acoustic system channels based at least in part on the multi-dimensional model interface, creating a forward model based at least in part on the location of the one or more distributed acoustic system channels and the one or more initial model layer properties, running an anisotropic ray tracing on the forward model, defining an upper limit and a lower limit for model parameters within the forward model, specifying parameters for an inversion for the model parameters, running the inversion with the model parameters to populate one or more members, selecting a solution from the one or more members based at least in part on stored error predictions, and calculating a mean and a standard deviation of an inverted model parameter to determine the location of the one or more distributed acoustic system channels.

Statement 2. The method of statement 1, wherein the multi-dimensional model interface is a gridded velocity model.

Statement 3. The method of statements 1 or 2, further comprising storing an initial choice of a ray parameter.

Statement 4. The method of statements 1-3, further comprising defining the upper limit and the lower limit for a channel location search space.

Statement 5. The method of statements 1-4, wherein the inversion is a non-linear inversion.

Statement 6. The method of statement 5, wherein the parameters for the inversion are a number of generations, a crossover probability or a step size.

Statement 7. The method of statements 1-5, further comprising collecting all population members from the inversion.

Statement 8. The method of statements 1-5 or 7, wherein the generating the multi-dimensional model interface is performed at least in part with a seismic depth image.

Statement 9. The method of statements 1-5, 7, or 8, wherein the multi-dimensional model interface includes at least three P-wave anisotropy parameters per layer.

Statement 10. The method of statements 1-5, or 7-9, further comprising disposing the one or more distributed acoustic system channels into a wellbore.

Statement 11. A system may comprise a distributed acoustic system, wherein the distributed acoustic system may comprise a fiber optic cable and a seismic source. The system may further comprise an information handling system configured to generate a three dimensional model interface, prepare a time table for a first arrival of a P-wave based at least in part on a multi-dimensional model interface, estimate one or more initial model layer properties based at least in part on the multi-dimensional model interface, estimate a location of one or more distributed acoustic system channels based at least in part on the multi-dimensional model interface, create a forward model based at least in part on the location of the one or more distributed acoustic system channels and the one or more initial model layer properties, run an anisotropic ray tracing on the forward model, define an upper limit and a lower limit for model parameters within the forward model, specify parameters for an inversion for the model parameter, run the inversion with the model parameters to populate one or more members, elect a solution from the one or more members based at least in part on stored error predictions, and calculate a mean and a standard deviation of an inverted model parameter to determine the location of the one or more distributed acoustic system channels.

Statement 12. The system of statement 11, wherein the multi-dimensional model interface is a gridded velocity model.

Statement 13. The system of statements 11 or 12, wherein the information handling system is configured to store an initial choice of a ray parameter.

Statement 14. The system of statements 11-13, wherein the information handling system is configured to define the upper limit and the lower limit for a channel location search space.

Statement 15. The system of statements 11-14, wherein the inversion is a non-linear inversion.

Statement 16. The system of statements 11-15, wherein the parameters for the inversion are a number of generations, a crossover probability, or a step size.

Statement 17. A method may comprise defining a search window for a multi-dimensional model interface to locate one or more distributed acoustic system channels, generating a random population of solutions for a location of the one or more distributed acoustic system channels, determining an error for at least one member of the population of solutions, adding at least one penalty to the population of solutions, choosing a solution from the population of solutions, determining a mutant solution for the population of solutions, generating a trial solution based at least in part on the mutant solution and the population of solutions, comparing the trial solution to a target solution to create one or more child solutions, and storing the one or more child solutions within an information handling system.

Statement 18. The method of statement 17, wherein the one or more child solutions are found from a greedy criterion.

Statement 19. The method of statements 17 or 18, further comprising applying a stopping criterion to the one or more child solutions.

Statement 20. The method of statement 19, wherein the stopping criterion compare the one or more child solutions to error predictions.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   measuring a velocity of one or more seismic waves with a distributed acoustic system disposed within a wellbore;
   generating a multi-dimensional model interface with an information handling system from the velocity of the one or more seismic waves;
   preparing a time table for a first arrival of a P-wave based at least in part on the multi-dimensional model interface;
   estimating one or more initial model layer properties based at least in part on the multi-dimensional model interface;
   estimating a location of one or more distributed acoustic system channels based at least in part on the multi-dimensional model interface;
   creating a forward model based at least in part on the location of the one or more distributed acoustic system channels and the one or more initial model layer properties;
   running an anisotropic ray tracing on the forward model;
   defining an upper limit and a lower limit for model parameters within the forward model;
   specifying parameters for an inversion for the model parameters;
   running the inversion with the model parameters to populate one or more members;
   selecting a solution from the one or more members based at least in part on stored error predictions; and
   calculating a mean and a standard deviation of an inverted model parameter to determine the location of the one or more distributed acoustic system channels within the wellbore.

2. The method of claim 1, wherein the multi-dimensional model interface is a gridded velocity model.

3. The method of claim 1, further comprising storing an initial choice of a ray parameter.

4. The method of claim 1, further comprising defining the upper limit and the lower limit for a channel location search space.

5. The method of claim 1, wherein the inversion is a non-linear inversion.

6. The method of claim 5, wherein the parameters for the inversion are a number of generations, a crossover probability or a step size.

7. The method of claim 1, further comprising collecting all population members from the inversion.

8. The method of claim 1, wherein the generating the multi-dimensional model interface is performed at least in part with a seismic depth image.

9. The method of claim 1, wherein the multi-dimensional model interface includes at least three P-wave anisotropy parameters per layer.

10. The method of claim 1, further comprising disposing the one or more distributed acoustic system channels into the wellbore.

11. A system comprising:
    a distributed acoustic system, wherein the distributed acoustic system comprises:
      a fiber optic cable configured to measure a velocity of one or more seismic waves in a wellbore; and
      a seismic source; and
    an information handling system configured to:
      generate a three dimensional model interface from the velocity of the one or more seismic waves;
      prepare a time table for a first arrival of a P-wave based at least in part on a multi-dimensional model interface;
      estimate one or more initial model layer properties based at least in part on the multi-dimensional model interface;
      estimate a location of one or more distributed acoustic system channels based at least in part on the multi-dimensional model interface;
      create a forward model based at least in part on the location of the one or more distributed acoustic system channels and the one or more initial model layer properties;
      run an anisotropic ray tracing on the forward model;
      define an upper limit and a lower limit for model parameters within the forward model;
      specify parameters for an inversion for the model parameter;
      run the inversion with the model parameters to populate one or more members;
      select a solution from the one or more members based at least in part on stored error predictions; and calculate a mean and a standard deviation of an inverted model parameter to determine the location of the one or more distributed acoustic system channels within the wellbore.

12. The system of claim 11, wherein the multi-dimensional model interface is a gridded velocity model.

13. The system of claim 11, wherein the information handling system is configured to store an initial choice of a ray parameter.

14. The system of claim 11, wherein the information handling system is configured to define the upper limit and the lower limit for a channel location search space.

15. The system of claim 11, wherein the inversion is a non-linear inversion.

16. The system of claim 15, wherein the parameters for the inversion are a number of generations, a crossover probability, or a step size.

17. The system of claim 11, wherein the information handling system is further configured to collect all population members from the inversion.

18. The system of claim 11, wherein the information handling system is further configured to generate the multi-dimensional model interface at least in part with a seismic depth image.

19. The system of claim 11, wherein the multi-dimensional model interface includes at least three P-wave anisotropy parameters per layer.

20. The system of claim 11, wherein the information handling system is further configured to dispose the one or more distributed acoustic system channels into the wellbore.

* * * * *